(12) United States Patent  
Hughes

(10) Patent No.: US 7,877,892 B2  
(45) Date of Patent: Feb. 1, 2011

(54) CIRCULAR SAW ALIGNMENT SYSTEM AND METHOD

(76) Inventor: Paul D. Hughes, 1302 W. Ohio Ave., Midland, TX (US) 79701

( * ) Notice: Subject to any disclaimer, the term of this patent is extended or adjusted under 35 U.S.C. 154(b) by 109 days.

(21) Appl. No.: 12/143,286

(22) Filed: Jun. 20, 2008

(65) Prior Publication Data

US 2009/0313840 A1    Dec. 24, 2009

(51) Int. Cl.
*B23Q 17/22* (2006.01)
(52) U.S. Cl. ........................................... 33/640
(58) Field of Classification Search ............ 33/640
See application file for complete search history.

(56) References Cited

U.S. PATENT DOCUMENTS

| 4,218,826 | A | | 8/1980 | Duke |
| 4,227,839 | A | * | 10/1980 | Conway ............... 408/16 |
| 4,443,950 | A | | 4/1984 | Cockeram |
| 5,014,443 | A | | 5/1991 | Gibbens, III |
| 5,207,007 | A | * | 5/1993 | Cucinotta et al. ........ 33/640 |
| 5,253,425 | A | | 10/1993 | Wozniak |
| 5,400,518 | A | | 3/1995 | Pawlowski |
| 5,454,170 | A | * | 10/1995 | Cook ................... 33/645 |
| 5,632,096 | A | | 5/1997 | Horvath |
| 5,735,054 | A | | 4/1998 | Cole |
| 6,073,532 | A | | 6/2000 | English |
| 6,195,905 | B1 | | 3/2001 | Cole |
| 6,532,679 | B2 | | 3/2003 | Cole |
| 6,587,184 | B2 | | 7/2003 | Wursch et al. |
| 6,665,946 | B1 | | 12/2003 | Reilly |
| 6,832,440 | B2 | * | 12/2004 | Navarro et al. ........... 33/638 |
| 7,069,666 | B2 | | 7/2006 | Navarro et al. |
| 7,243,440 | B2 | | 7/2007 | DeKeyser |
| 7,487,599 | B1 | * | 2/2009 | Spirito ................. 33/640 |
| 2002/0092370 | A1 | * | 7/2002 | Pawelek et al. ......... 73/866.5 |

OTHER PUBLICATIONS

PCT Patent Office, "Notification of Transmittal of International Search Report and The Written Opinion Of The International Searching Authority," PCT Patent Office.

* cited by examiner

*Primary Examiner*—Christopher W Fulton
(74) *Attorney, Agent, or Firm*—Gable Gotwals

(57) ABSTRACT

A circular saw alignment system and method, the system having a first longitudinal member securable to a saw arbor and a second member perpendicular to the first member. The first member having one or more locating devices. The locating devices can be bubble indicators or dial indicators located at the first or second end of the second member.

19 Claims, 3 Drawing Sheets

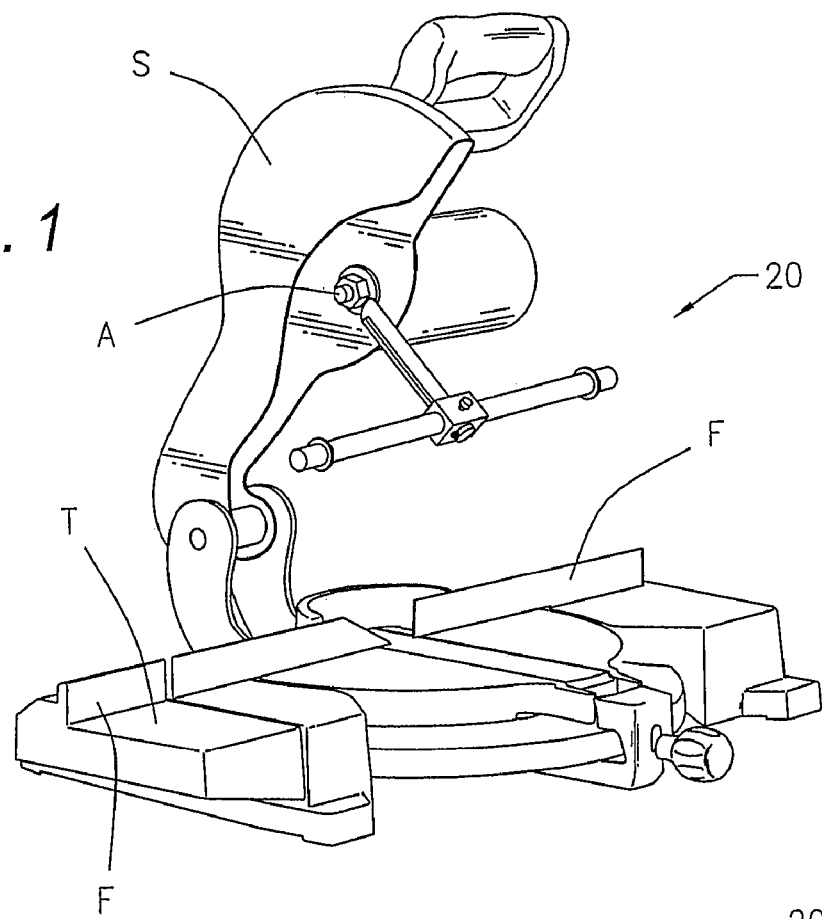
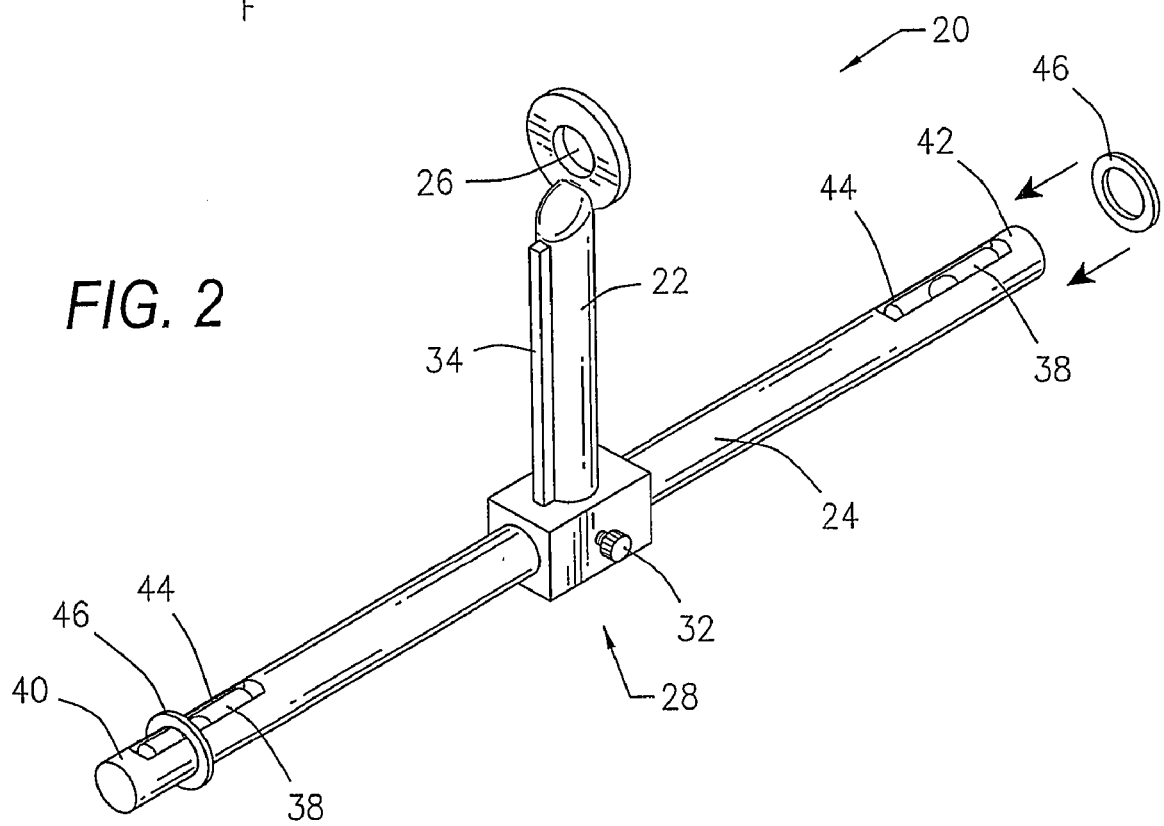

CIRCULAR SAW ALIGNMENT SYSTEM AND METHOD

FIELD OF THE INVENTION

This invention relates to operating and maintaining various circular saws. More particularly, the present invention is a system and method for insuring precise alignment of a standard miter saw, table saw, compound miter saw or radial arm saw.

BACKGROUND OF THE INVENTION

In woodworking precise and accurate cuts are crucial in obtaining the proper fit and finish in the finished product. Compound miter saws and radial arm saws with circular blades are commonly used to make precision cuts. However, after repeated use these saws can come out of alignment. This can result from the tilt of the saw blade being out of vertical or the axis of rotation of the blade, also known as the arbor, being out of square with the fence or table. To be properly aligned, the arbor must be aligned parallel with both the fence and the table. This in turn means the blade will be perpendicular with both the fence and the table.

If a saw gets out of alignment the inaccuracy of the cut is compounded in situations where wood on both sides of the joint are being cut. Thus, if the saw is 3° out of alignment and both sides of the wood are cut, this can lead to the joint being 6° out of alignment.

In the prior art the most common way to realign a compound miter saw or a radial arm saw is to use a carpenter's triangle to insure the saw blade is perpendicular with the fence as well as perpendicular with the table of the saw. This method has two drawbacks. First a carpenter's triangle is not a precise instrument, thus leading to inaccuracies in the alignment. Secondly, the saw blade can be out of plane, thus leading to further inaccuracies in the alignment.

The prior art has attempted to address these issues by providing various devices which can be affixed to the saw blade. However, these devices do not address and remedy inaccuracies arising from the saw blade being out of plane or otherwise bent.

Still other prior art have attempted to solve this problem by aligning the saw using a device bolted to the arbor of the saw. However, these devices still rely upon using a second instrument, namely a carpenter's triangle or other triangle. Here again these triangles are not the most precise instruments thus leading to further inaccuracies in the alignment.

What is needed is a system and method for properly and accurately aligning a standard miter saw, table saw, compound miter saw or a radial arm saw.

Further, what is needed is a system and method for properly aligning a standard miter saw, table saw, compound miter saw or radial arm saw without resorting to the use of a carpenter's triangle or other triangle.

Finally what is needed is a system and method which properly and accurately aligns the arbor of a standard miter saw, table saw, compound miter saw or radial arm saw.

BRIEF SUMMARY OF THE INVENTION

The present invention is a system and method for proper alignment of a compound miter saw, radial arm saw or other circular saw to insure the arbor is parallel with the fence and/or the table of the saw. This in turn means the plane of the saw blade is perpendicular to both the saw table and to the backstop or fence. The system is secured to the arbor of the saw and has a first longitudinal member extending from the arbor on a plane perpendicular to the arbor. There is a second longitudinal member that extends perpendicular from the first longitudinal member. The second longitudinal member can be fitted with bubble indicators or dial indicators located at opposing ends.

The method of the present invention involves measuring the distance between the first and second ends of the second member and the fence and adjusting the saw until these two measurements are equal. The distance between the first and second ends of the second member are then measured to the table of the saw and adjusted until these two distances are equal.

The method can also include adjusting the saw until the table of the saw is level. The saw is then adjusted until the bubble indicators on the second member of the alignment system indicate that the second member is also level. The system can then be rotated on the arbor and the saw then aligned and adjusted until the first and second ends of the second member or an attachment there to are in contact with the fence.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings (which are not to scale) where:

FIG. 1 is a perspective view of the alignment system of the present invention installed on a compound miter saw.

FIG. 2 is a perspective view of the first embodiment of the present invention.

DETAILED DESCRIPTION OF THE PREFERRED EMBODIMENT(S)

Figure 3:
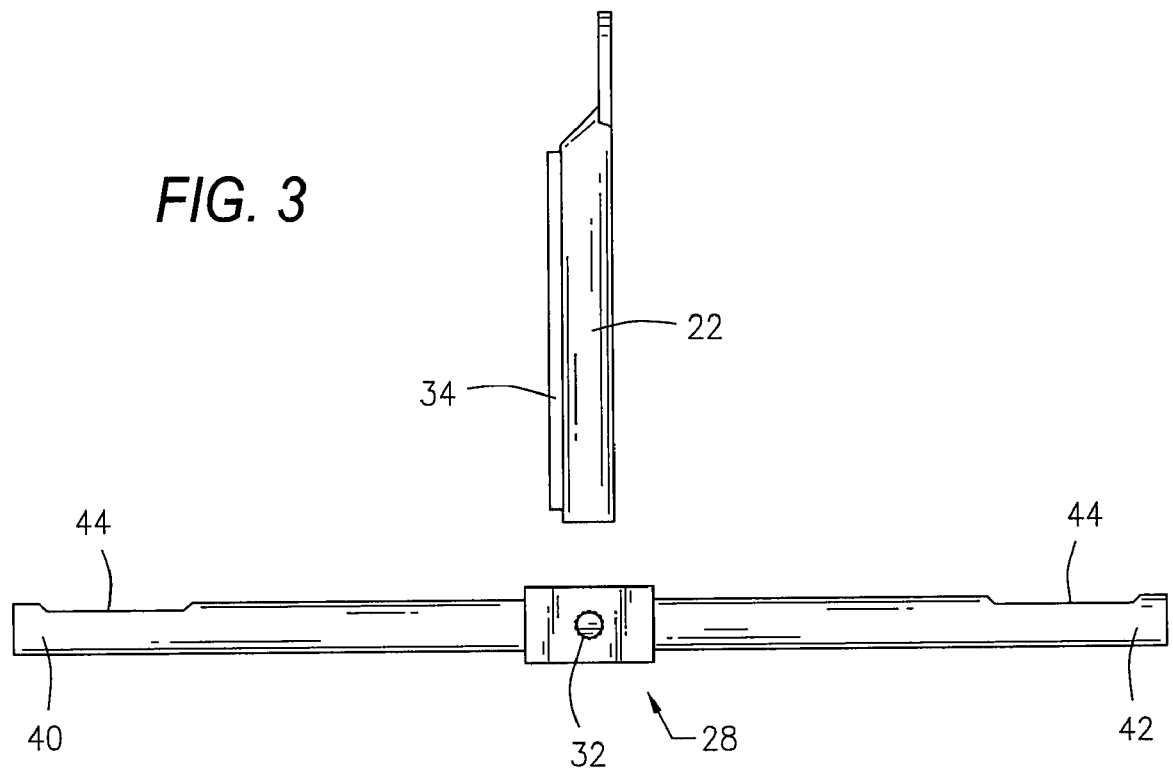
FIG. 3 is an exploded front view of the embodiment of the present invention shown in FIG. 2.
Figure 4:
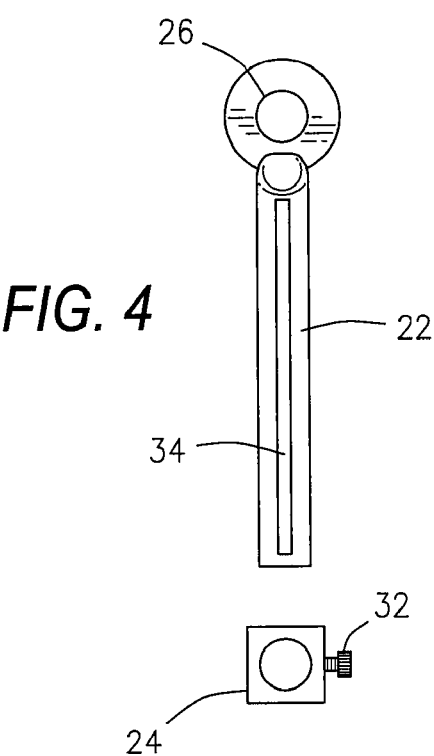
FIG. 4 is an exploded side view of the embodiment of the present invention shown in FIGS. 2 and 3.
Figure 5:
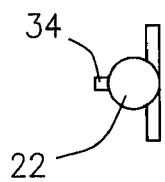
FIG. 5 is a bottom view of the first member of the present invention from the embodiment shown in FIGS. 2 through 4.
Figure 6:
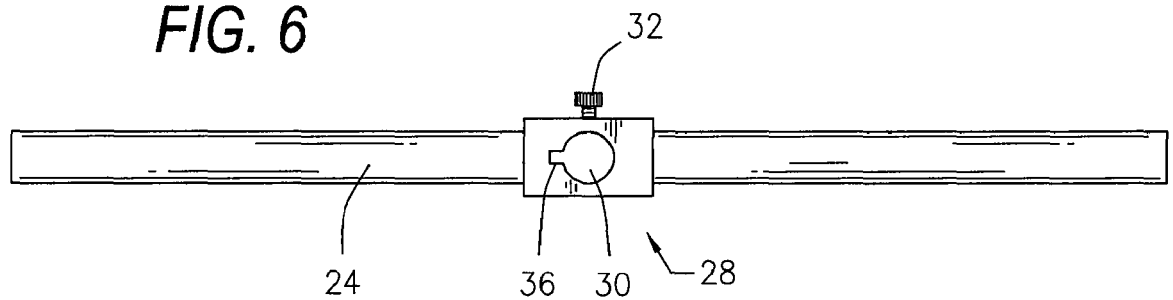
FIG. 6 is a bottom view of the second member of the present invention from the embodiment shown in FIGS. 2 through 5.

Turning now to FIG. 1, the circular saw alignment system 20 is shown mounted on the arbor A of a compound miter saw S. The arbor A is the axis upon which the saw blade (not shown) rotates. The saw S has a table T which is perpendicular to the backstop or fence F. The system 20 as further seen in FIGS. 2 through 7 has a first member 22 and a second member 24. The first member 22 is perpendicular to the arbor A The second member 24 is perpendicular to the first member 22. The first member 22 is removably mountable to the arbor A of the saw S. With the embodiments shown in FIGS. 2 through 7 this is accomplished by passing the bolt of the arbor A through a passageway 26 and securing the bolt to the arbor A.

The first member 22 is secured to the middle portion 28 of the second member 24. The embodiment of the alignment system 20 shown in FIGS. 2 through 7 has the first member 22 slidingly engaging the second member 24. The second member 24 has a passageway 30 located in the middle portion 28. The passageway 30 is sized to receive the first member 22.

The second member 24 can be secured in place on the first member 22 by tightening the set screw 32.

The second member 24 is kept square with the plane of the arbor A by a key 34 located on the first member 22 and a corresponding keyway 36 located adjacent to the passageway 30 found in the middle portion 28 of the second member 24. The same results can be accomplished by the first member 22 having a non-circular cross section received in a complimentary passageway 30 in the second member 24. The non-circular cross section would be in lieu of the key 34 and keyway 36. Similarly the alignment system 20 could be constructed by having the first member 22 permanently attached to the second member 24, such that the two members 22 and 24 are perpendicular to one another. However having the first and second members 22 and 24 permanently attached to one another would limit the system 20 to use on a limited range of saw sizes.

In the embodiment of the alignment system 20 shown in FIG. 2, a bubble indicator 38 is located in both the first end 40 and the second end 42 of the second member 24. These can either be mounted to the surface of the second member 24 or as shown in FIG. 2 they can be mounted in a groove 44, cut into the second member 24 and sized to receive the bubble indicators 38. The bubble indicators 38 can be either permanently mounted in the grooves 44 or removably placed in these grooves 44 and held in place by a washer 46 sized to slide over the second member 24. The washer 46 encircles the second member 24 and holds the bubble indicators 38 in place in the grooves 44.

Figure 7:
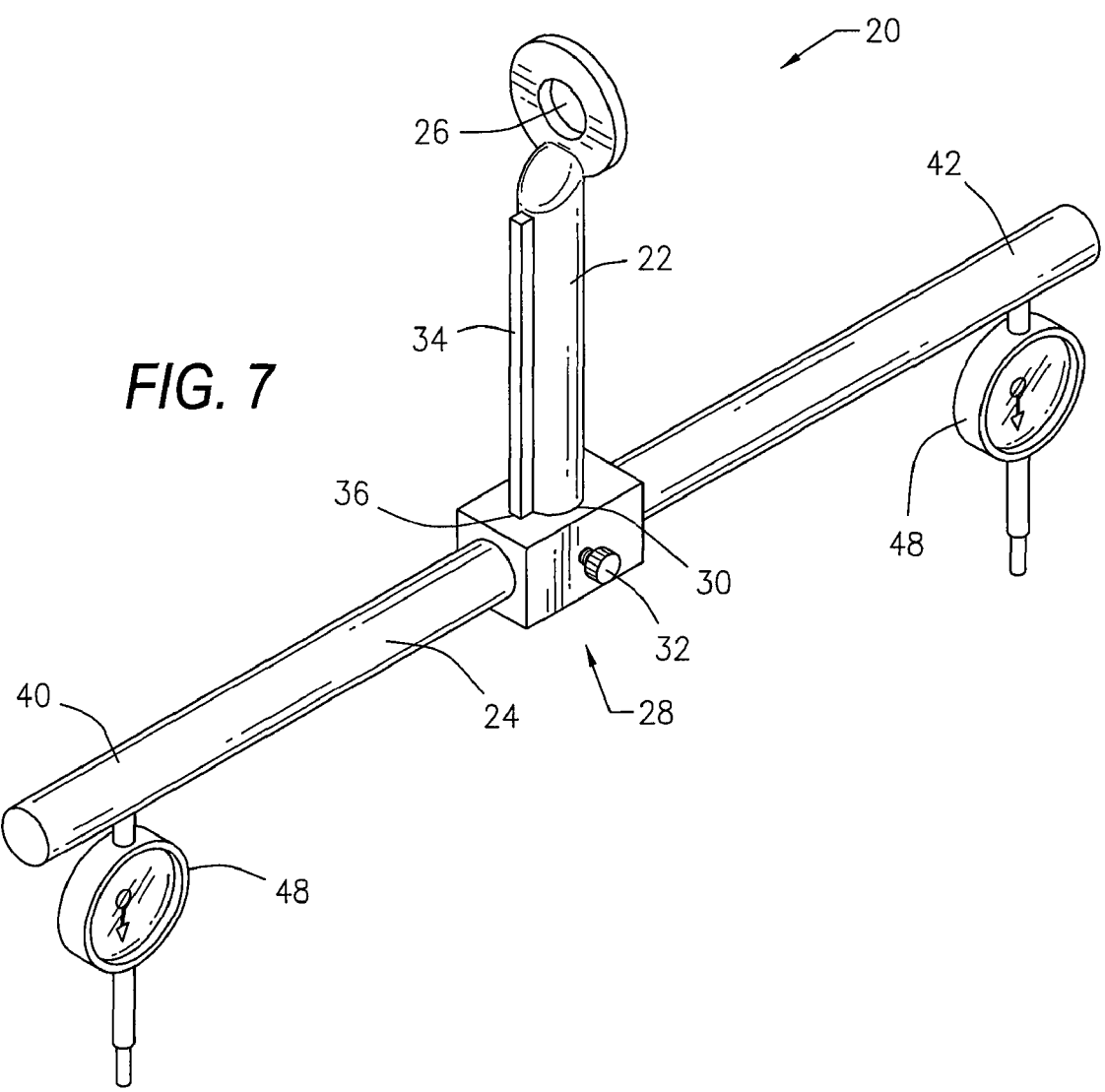
FIG. 7 is a perspective view of the second embodiment of the present invention.

A second embodiment of the alignment system 20 of the present invention is shown in FIG. 7. The second embodiment uses dial indicators 48 in lieu of the bubble indicators 38. The dial indicators 48 are located on the first and second end 40 and 42 of the second member 24. They can either be permanently mounted or removably mounted. In the preferred embodiment they are adjustable so they can measure the distance to both the fence F and the table T.

When using the first embodiment of the alignment system 20 having the bubble indicators 38, the user levels the table T of the saw S. The user removes the blade from the saw S and attaches the alignment system 20 to the arbor A of the saw S by passing the arbor bolt through the passageway 26 in the first member 22. The bolt is securely tightened to hold the alignment system 20 in place. The user adjusts the tilt of the saw S until both bubble indicators 38 indicate the alignment system 20 is level.

The alignment system 20 is then rotated on the arbor A towards the fence F. The saw S is then adjusted until the first and second ends 40 and 42 of the second member 24 are in contact with the fence F. Accuracy of this second adjustment can be improved by using a structure, such as the washers 46, which extending perpendicular from the first and second ends 40 and 42 of the second member 24 for the alignment with the fence F. In this case the saw S is adjusted until both of the washers 46 or other structure are in contact with the fence F. Once the saw S is aligned with the table T and the fence F, the user removes the alignment system 20 by removing the bolt from the arbor A. The blade is re-attached to the arbor A. Once the bolt is tightened the saw S is ready to use.

If the second member 24 is equipped with washers 46 or another structure extending from the first and second ends 40 and 42 of the second member 24. They can be used to measure the distance between the table T and the first and second ends 40 and 42 of the second member 24. Thus this measurement can be used in lieu of leveling the table T and the second member 24.

Depending upon the layout of the second member 24, it may be necessary to place the bubble indicators 38 in the grooves 44 after the alignment system 20 is secured to the arbor and prior to adjusting the tilt of the saw S. In this event it may be necessary to slide the washers 46 over the first and second ends 40 and 42 of the second member 24 in order to secure the bubble indicators 38. Once the saw S has been adjusted the bubble indicators can be removed either before or after removing the alignment system 20 from the saw S.

The second embodiment of the alignment system 20 as shown in FIG. 7 is used in a similar manner. Here again the alignment system 20 is secured to the arbor A of the saw S. Once the saw blade has been removed the alignment system 20 is secured to the arbor A by a bolt passing through the passageway 26 of the first member. The distance between the first end 40 of the second member and the table T and the distance between the second end 42 of the second member 24 and the table T are measured using the dial indicators 48. The tilt of the saw S is then adjusted until the measurement on both dial indicators 48 are the same.

The alignment of the cut angle is then adjusted. This entails measuring the distance from the first end 40 of the second member 24 to the fence F and the distance from the second end 42 of the second member 24 to the fence F. The angle of the cut is then adjusted until the readings on both of the dial indicators 48 are the same. The alignment system 20 is then removed from the saw S by removing the bolt from the arbor A. The saw S is then ready for use once the blade has been reinstalled on the arbor A.

The foregoing description details certain preferred embodiments of the present invention and describes the best mode contemplated. It will be appreciated, however, that changes may be made in the details of construction and the configuration of components without departing from the spirit and scope of the disclosure. Therefore, the description provided herein is to be considered exemplary, rather than limiting, and the true scope of the invention is that defined by the following claims and the full range of equivalency to which each element thereof is entitled.

What is claimed is:

1. A circular saw alignment device comprising:
   a first longitudinal member mountable directly to a saw arbor;
   a second longitudinal member extending perpendicular to said first longitudinal member; and
   a locating device located on said second member.

2. A device according to claim 1 further comprising said first member secured to a middle portion of said second member.

3. A device according to claim 2 further comprising said first and second members being permanently secured to one another.

4. A device according to claim 2 further comprising:
   a key extending along said first member;
   a passageway and an adjacent keyway located in said middle portion of said second member; and
   a set screw located in said middle portion of said second member;
   wherein said passageway and adjacent keyway are located and sized to receive and slidingly engage said first member and key and said set screw is located to secure said second member to said first member.

5. A device according to claim 2 further comprising:
   said first member having a noncircular cross section;
   a passageway located in said middle portion of said second member; and a set screw located in said middle portion of said second member;

wherein said passageway is located and sized to receive and slidingly engage said noncircular cross section of said first member and said set screw is located to secure said second member to said first member.

6. A device according to claim 1, further comprising said locating device located on a first end of said second member.

7. A device according to claim 6, further comprising said locating device located on a second end of said second member.

8. A device according to claim 6, said locating device comprising a leveling bubble.

9. A device according to claim 8, further comprising a groove located on said first end of said second member and sized to receive said leveling bubble.

10. A device according to claim 9 further comprising a washer sized to slidingly engage and encircle said first end of said second member while securing said leveling bubble in said groove.

11. A device according to claim 8 further comprising said leveling bubble being permanently secured to said first end of said second member.

12. A device according to claim 6, said locating device comprising a feeler gauge.

13. A device according to claim 6, said locating device comprising a structure extending from said second member.

14. A device according to claim 13, said structure comprising a washer.

15. A method of aligning a circular saw, said method comprising:

securing a first longitudinal member directly to a saw arbor;

providing a second longitudinal member extending perpendicular from the first longitudinal member; and using a locating device on the second perpendicular member to determine the orientation of the saw arbor.

16. The method of claim 15, the step of determining the orientation of the saw arbor comprising: measuring the distance between two points on the second member and a fence.

17. The method of claim 15, the step of determining the orientation of the saw arbor comprising: measuring the distance between two points on the second member and a saw table.

18. The method of claim 15, the step of determining the orientation of the saw arbor comprising leveling a table of the saw and leveling the second member.

19. A method of aligning a circular saw, said method comprising:

securing a first longitudinal member directly to a saw arbor;

providing a second longitudinal member extending perpendicular from the first longitudinal member; and using a locating device on the second perpendicular member to determine the orientation of the saw arbor by measuring the distance between two points on the second member and a fence and measuring the distance between two points on the second member and a table.

* * * * *